Figure 8:
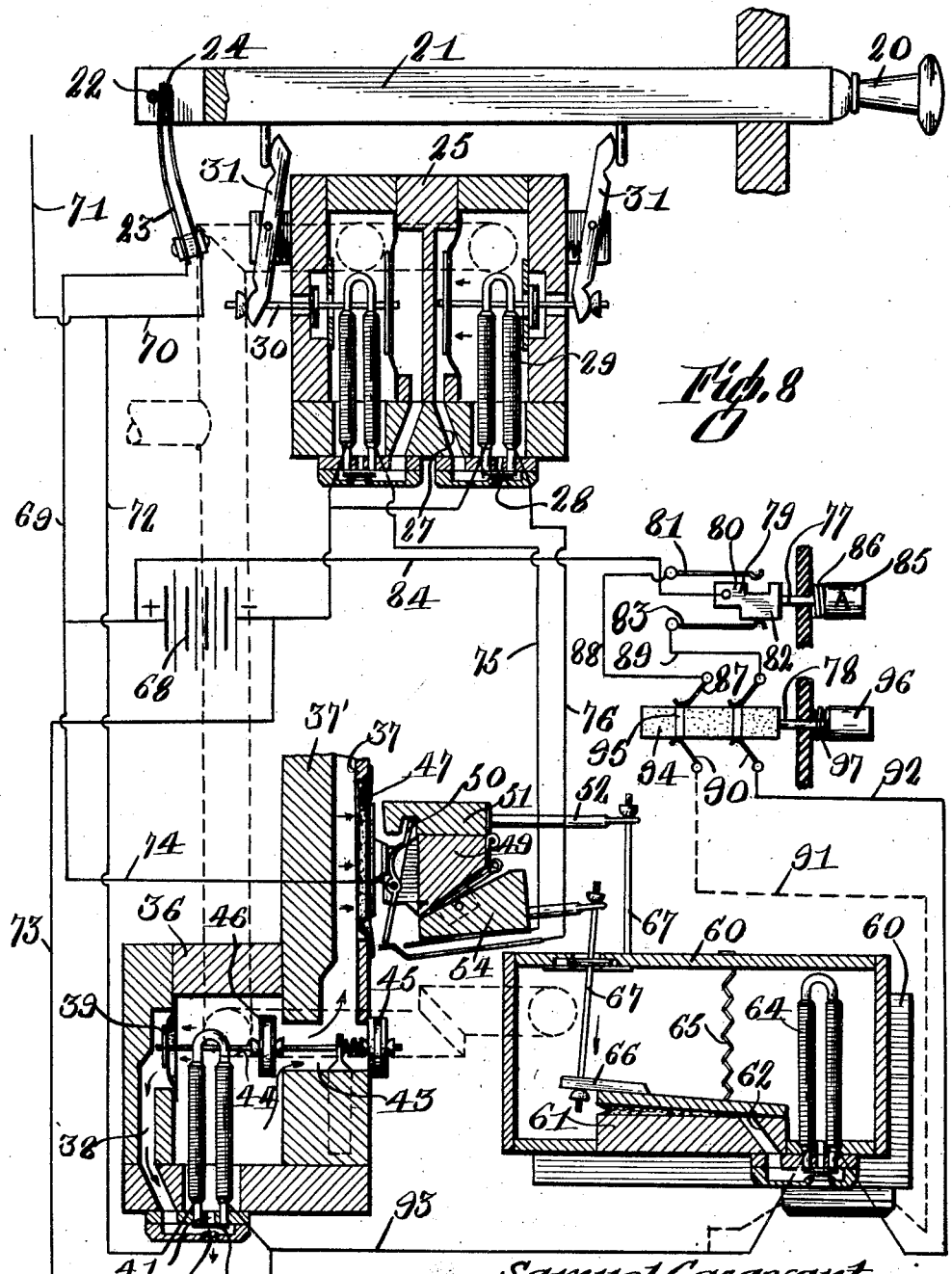

May 27, 1930.  S. CASAVANT ET AL  1,760,813
COMBINATION ORGAN STOP ACTION
Filed Jan. 7, 1929   5 Sheets-Sheet 1
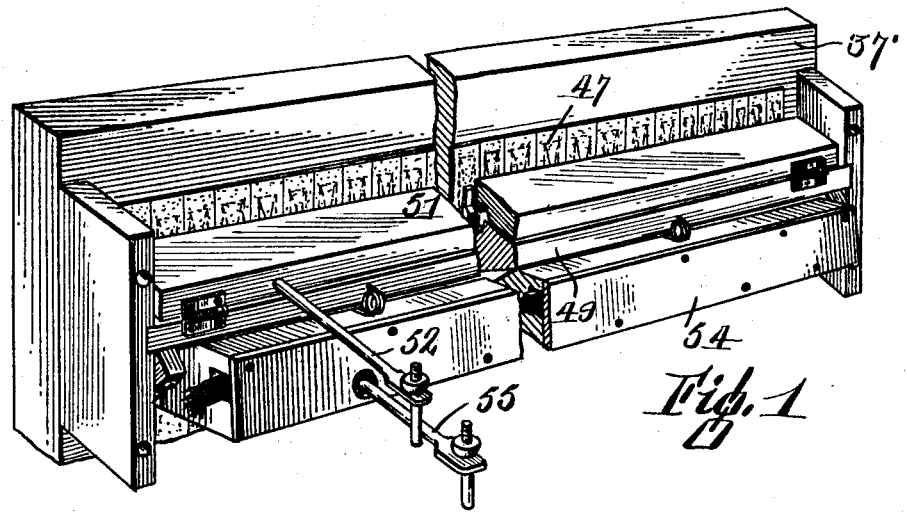
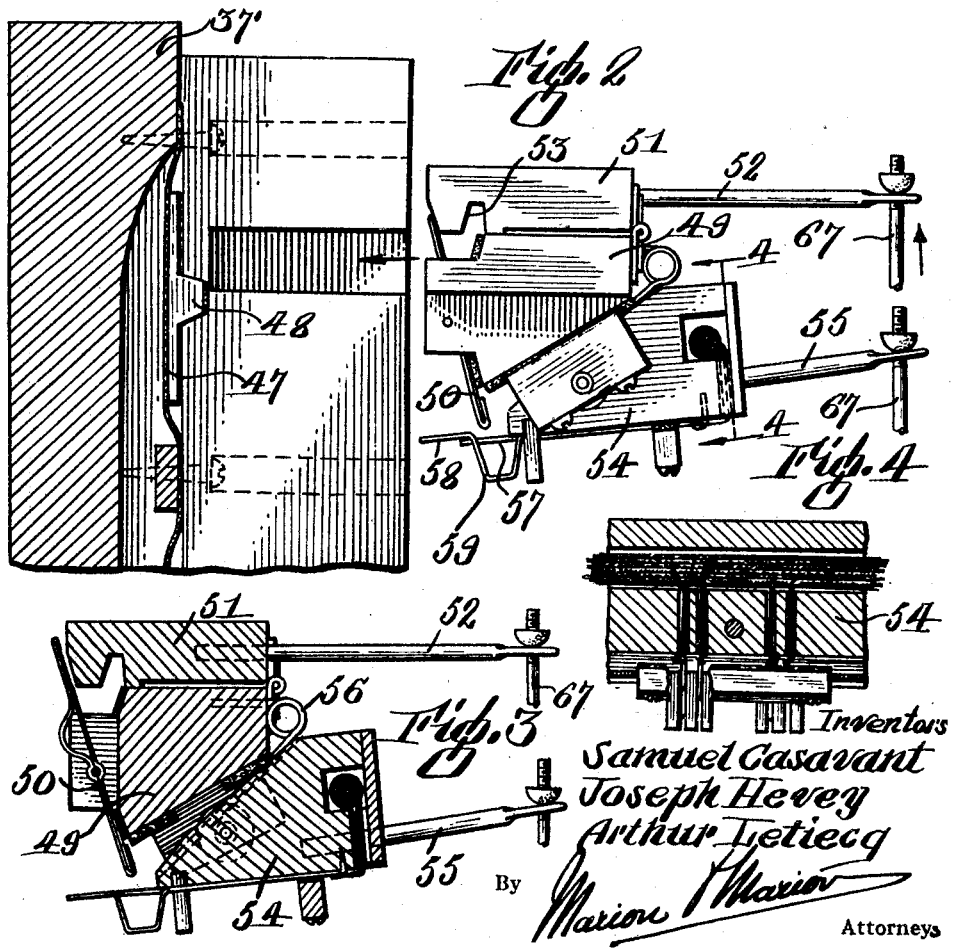

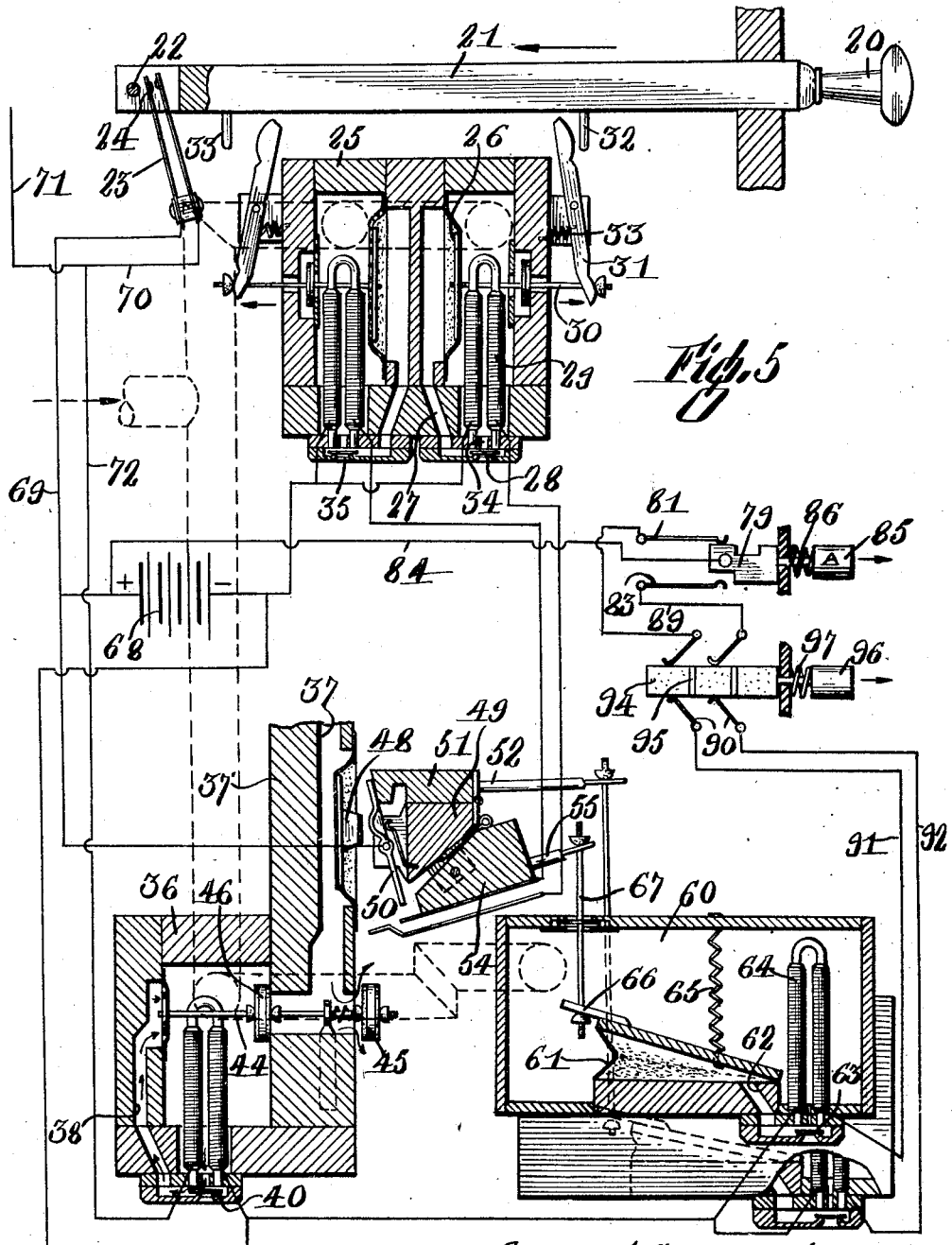

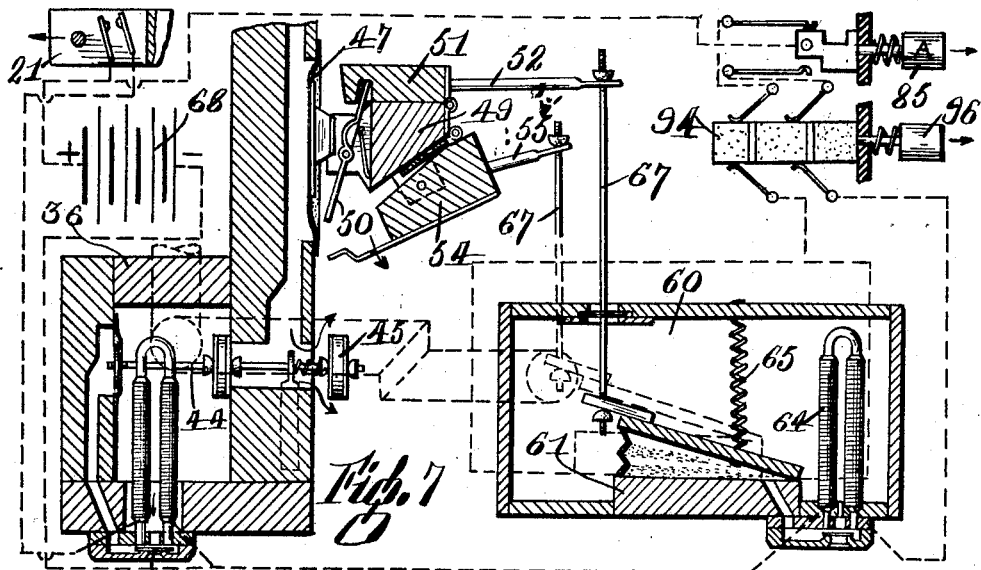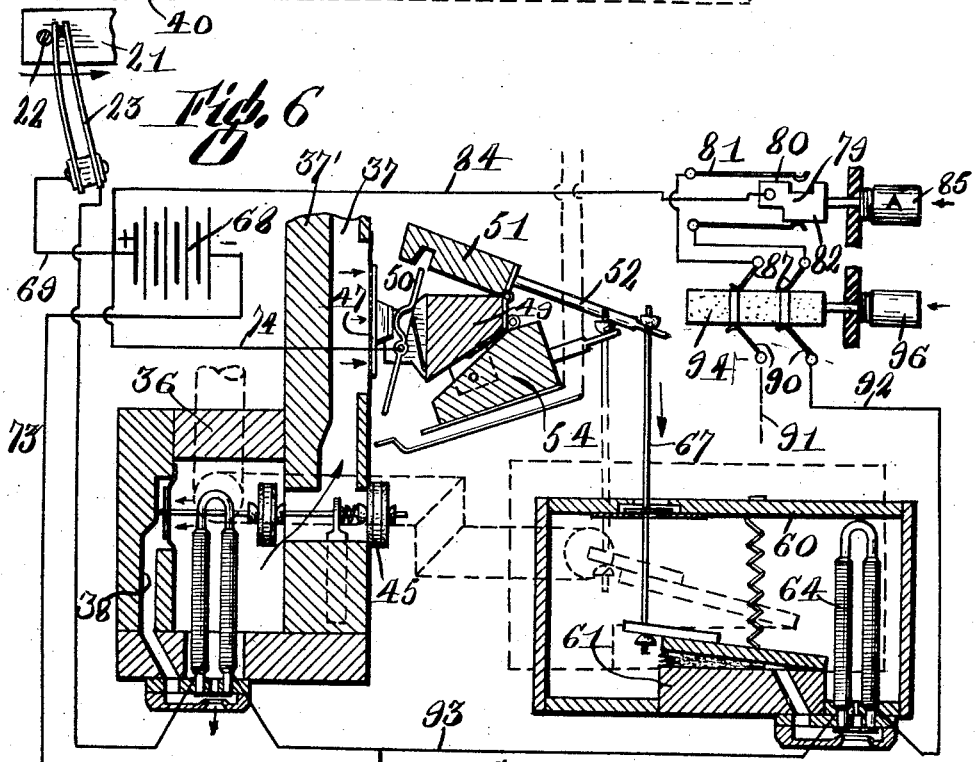

May 27, 1930.  S. CASAVANT ET AL  1,760,813

COMBINATION ORGAN STOP ACTION

Filed Jan. 7, 1929  5 Sheets-Sheet 4

Samuel Casavant
Joseph Hevey & Arthur Letiecq Inventors

By *Marion & Marion*

Attorneys

May 27, 1930. S. CASAVANT ET AL 1,760,813
COMBINATION ORGAN STOP ACTION
Filed Jan. 7, 1929  5 Sheets-Sheet 5
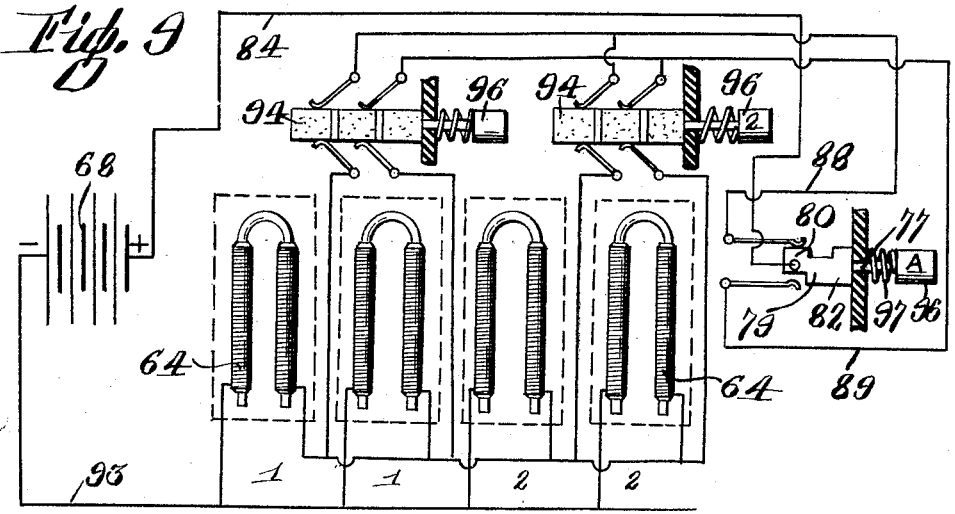
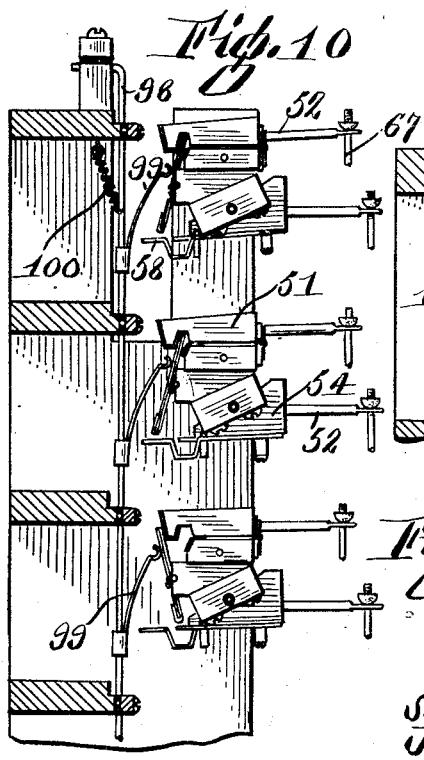
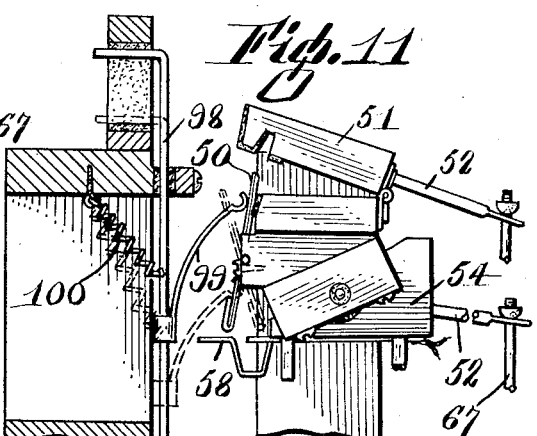
Samuel Casavant
Joseph Hevey
Arthur Letieca
Inventors
By Marion & Marion
Attorneys Patented May 27, 1930

1,760,813

UNITED STATES PATENT OFFICE

SAMUEL CASAVANT, JOSEPH HEVEY, AND ARTHUR LETIECQ, OF ST. HYACINTHE, QUEBEC, CANADA

COMBINATION ORGAN-STOP ACTION

Application filed January 7, 1929. Serial No. 330,876.

The present invention relates to an improved combination organ stop action and has for its primary object to provide a mechanism whereby the stops of an organ can be easily and reliably operated in different combination.

A further object of the invention is the provision of mechanism for controlling a pre-selected combination of stop actions by the operation of a single button.

Another object of the invention is the provision of a combination organ stop action embodying means for electropneumatically actuating stop controlling switch means.

Other objects and advantages of the invention will become apparent as the description progresses.

In the accompanying drawing forming a part of this specification and in which like reference characters are employed to designate corresponding parts throughout the same:

Figure 1 is a perspective view of the preferred form of stop controlling switch mechanism, Figure 2 is an enlarged side elevational view of the same in separated position, Figure 3 is a vertical section through the switch actuating mechanism, Figure 4 is a longitudinal section taken on the line 4—4 of Figure 2, Figure 5 is a diagrammatic illustration of the assembled stop action controlling mechanism in inoperative position, Figures 6 and 7 are similar views illustrating the adjusting and the set positions thereof, Figure 8 is a similar view showing the mechanism in operating position, Figure 9 is a front elevational view of a modified form of stop controlling switch mechanism, Figure 10 is a side elevational view of the same in adjusting position, Figure 11 is a similar view in an advanced position, and Figure 12 is a vertical section showing the switch mechanism in set position.

Referring to the preferred form of the mechanism, shown in Figures 1 to 8, inclusive, the numeral 20 generally designates an organ stop controlling knob provided with a longitudinal shank 21, said knob being normally disposed for horizontal sliding movement. At its inner end, the shank 21 carries a transversely extending pin 22 disposed to engage a pair of resilient contact arms 23 upon extended or outward movement of the knob. The arms 23 are normally disposed in adjacent separated positions and carry adjacent their upper free ends inwardly directed contacts 24 which are compressed to contacting position when the knob is in out or operating position.

Mounted adjacent the knob, and disposed to operatively slide the same to a retracted "off" position or an extended "on" position, is a knob actuating mechanism embodying a wind chest 25 divided by an intermediate partition to form a pair of wind compartments. In each compartment is mounted a flexible partition or puff member 26 separating the compartment proper from a by-pass duct 27, the outlet to which is normally closed by a gravity actuated valve 28 which may be operated to duct opening position by an electro-magnet 29. Attached to the puff member 26, and extending transversely through the outer wall of the chest compartment, is a rod 30 disposed to actuate the lower end of a rocker arm 31. The rocker arm 31 is pivoted intermediate its ends to a bracket and arranged so that the upper end will engage a depending projection 32 attached to the stop shank when said upper end of the rocker arm is swung in a predetermined direction. The lower end of each rocker arm is normally extended from the chest by means of a spring 33'. This construction is designed for automatically sliding the action controlling knob to an inwardly extending "off" position or an outwardly extending "on" position. As illustrated, the electro-magnet 29 is supported in an opening in the bottom wall of the chest which opening is enclosed by a hand cap provided with a relatively small port 34 arranged in a position opposed to an exterior port 35. The valve 28 operates between the opposed ports 34 and 35 so that when the electromagnet is energized the valve will be lifted to close the interior port 34 and provide exterior communication with the by-pass duct 27. When the electro-magnet is de-energized, the valve drops on to a seat formed at the edge of the exterior port 35 to close this port and the by-pass duct.

The knob actuating mechanism is electrically connected with valvular control means disposed in an associated structure of the organ, this structure comprising a wind chest 36 having communication with a longitudinal, preferably vertically extending air duct 37 formed in a vertically extending wall 37'. In one side of the wind chest 36 is formed an angular by-pass duct 38 having its inner end partitioned from the interior of the duct by a flexible puff 39 and having the outer end arranged to communicate with an outlet normally closed by a gravity actuated valve 40, which valve is operable to close an interior port 41 or an exterior port 42 simulating the construction described with reference to the valve mechanism in the knob controlling structure. An angular passage 43 is formed in the inner side wall of the chest 36 providing communication between the interior chamber of the chest and the vertical wind duct 37. Rigidly attached to the puff member 39, and movable therewith, is a transversely extending valve rod 44 carrying an outer annular valve 45 and an intermediate annular valve 46. The valves 45 and 46 are arranged so that when the exterior port 42 is open the pressure within the chest will force the puff 39 outwardly within the by-pass duct so that the valve 45 will close the exterior of the passage 43 and provide communication between the chest chamber and the duct 37. When the valve 40 is dropped to close the exterior port, the puff 39 is drawn inwardly within the chest chamber and the valve 46 is slidably actuated to close the entrance to the angular passage 43 and thus cut off the duct 37 from the chest chamber.

In the outer surface of the wall 37' are formed a series of vertically aligned apertures arranged at regular intervals and having mounted therein flexible puffs 47 carrying outwardly projecting lugs 48. When the valve mechanism in the chest 36 is actuated to provide communication between the interior of the chest and the duct 37, the air discharged into the duct will extend the puffs whereas, when the valve mechanism is actuated to close the passage 43 the air pressure will be diminished and the puffs will assume contracted positions in the duct.

Each of the vertically extending ducts or passages 37 enclose a series of switch mechanisms arranged to establish communication between a particular stop of the organ and a plurality of stop actuating knobs operable to control the operation of the stop. In the wall 37' are formed a series of parallel adjacent wind ducts 37 having switch actuating pump members arranged in transverse alignment whereby a group or combination of stops can be simultaneously operated.

Supported exteriorly of and opposed to each transverse or horizontal row of puffs 47 is a longitudinal switch block 49 having a tapering form in cross section and provided at the inner portion with vertically directed slots opposed to each puff. In each slot of the block members 49 is mounted a straight contact bar 50 pivoted intermediate its ends for vertical rocking movement. Immediately above the pivot connection, the bar is formed with an inwardly directed hump disposed to engage the puff lug 48.

Hingedly connected with each block 49, and disposed to normally lie on the upper horizontal surface thereof, is a vertically swinging contact gripping strip 51 having an outwardly projecting arm 52 attached thereto. Adjacent its inner edge, the strip 51 is formed with a longitudinal undercut groove 53 formed to engage the upper extremities of the contact bars 50 when the same are urged outwardly.

To the lower portion of the block 49 is hingedly connected a vertically adjustable contact carrying strip 54 provided with an outwardly projecting arm 55. The strip 54 is normally urged to a position away from the fixed block 49 by means of a spring 56, this strip carrying a series of contact wires arranged in separated pairs designed to cooperate with the lower end of each contact bar 50. Each pair of wires embodies a straight contact wire 57 projecting beyond the inner edge of the strip 54 and a complementary contact wire 58 having the inner extremity projecting inwardly of the inner end of the wire 57 and having its intermediate portion offset as at 59 at a position transversely opposed to the contacting portion of the complementary wire 57.

The strips 51 and 54, co-operating with the stop switch mechanism, are actuated through the instrumentality of wind motors embodying wind chests 60 within which are mounted motor bellows 61. Through the bottom board of the bellows 61 is formed a passage 62 communicating with a valve casing having interior and exterior ports, one or the other of which is closed by a valve 63 operated by an electro-magnet 64 or by gravity. The top board of the bellows 61 is normally elevated by a spring 65 and carries at its outer free edge an extension bracket 66 disposed to engage the lower end of an operating rod 67. The upper ends of the rods 67 are each attached to one arm 52 or 55 of the respective strips 51 and 54.

The various stop action controlling mechanisms are operated through electric circuits. One of the stop knob control contact arms 23 is connected with a source of electrical energy, preferably a battery 68, through a conductor 69. To the opposed arm is connected a pair of conductors 70 one of which extends to the action operating mechanism through a conductor 71 and the other 72 is connected with one pole of the valve controlling magnet in the wind chest 36. The opposed pole of this magnet is connected with the battery through a conductor 73. The switch contact bars 50 are directly connected with the battery through a conductor 74. The respective contact wires 57 and 58, co-operating with each bar 50, are connected with the magnets 29 through the medium of conductors 75 and 76, the wires 57 being connected with the knob retracting motor, while the wires 58 are connected with the knob extending motor.

Mounted in conveniently accessible positions on the organ, preferably adjacent the manual thereof, is an adjusting switch 77 and a plurality of control switches 78. The adjusting switch structure embodies a movable contact plate 79 having an inner offset contact 80 engageable with a fixed switch terminal 81 and an outer reversely offset contact 82 engageable with an opposed terminal 83. The adjustable contact member 79 is connected with the battery through a conductor 84 and is operated by means of a button 85 disposed on the outer end of a stem attached to the contact member. The button 85 is normally urged to an ejected or out position by means of a compression spring 86 thus normally retaining the contact pole 80 in engagement with the terminal 81. The terminals 81 and 83 are connected with a pair of control switch terminals 87 through conductors 88 and 89.

Arranged in complementary positions with respect to the terminals 87 are co-operating terminals 90 having electrical connection with magnets of the switch actuating wind motors 60 through conductors 91 and 92 controlling the motors of the hinged strips 51 and 54 respectively. These magnets are also connected with the battery 68 through conductors 93.

The circuit between the terminals 87 and 90 is controlled by a switch block 94 formed of insulating material and carrying a pair of spaced conductors 95 arranged to simultaneously engage both pairs of terminals when the block is forced inwardly to complete the electric circuit therebetween. The block 94 is attached to the stem of the control switch 78, a button 96 being fixed on the outer end of the stem. The button 96 is normally urged to the ejected outward position by means of a compression spring 97 to normally break the circuit between the terminals 87 and 90.

With particular reference to Figure 9, wherein is diagrammatically illustrated an electric circuit employing several of the control switches 78, it will be noted that the mechanism is designed so that several preselected stop action combinations may be utilized by the organist during the operation of the instrument. Each combination of stop actions is controlled by a unitary stop circuit switch structure disposed in alignment with a horizontal row of puffs. Additional combinations may be effected through a series of additional stop switch mechanisms disposed in horizontal arrangement parallel with one another in registration with the vertical rows of puffs so that an individual stop action may be repeatedly operated during the playing of a selection by the organist. This construction provides a series of electrical control means for each stop action operated by a corresponding number of stop knobs.

As disclosed in Figures 10 and 11, the pivoted switch bars 50 may be actuated by a modified type of structure embodying, in this instance, a vertical rod 98 mounted for vertical reciprocating movement and carrying a series of arcuate spring arms 99. This structure displaces the pneumatically operated puff members employed in the preferred form of construction for adjusting the position of the contact bars. The bar 98 is normally urged to a predetermined position by means of a spring 100 and is actuated to contact bar adjusting position by means of a small motor or other suitable mechanism when the circuit is energized.

In the operation of the apparatus, the combination stop action mechanism is arranged as illustrated in Figure 5 when the organ is inactive and prior to the selection of the desired stop action combinations. In this position, the contact bars 50 are released and in arrangement for the adjustment or setting operation. Before the performance of one or more musical selections, the organist adjusts or "sets" the various stop action combinations to be employed while rendering the selection. This is effected by initially pulling out or ejecting the control knobs 20 corresponding to each stop action comprising a predetermined group or combination. Such movement of the knobs will close the contacts 24 so that the electromagnet in the wind chest is energized, thus lifting the valve 40 from its seat on the lower outlet 42 to a position closing the upper port 41. When the valve is arranged in this position, the wind pressure in the chest 36 will force the puff 39 outwardly and simultaneously shift the rod 44 carrying the valves 45 and 46 to the position shown in Figure 6 wherein compressed air is discharged into the vertical ducts 37. The pressure of the air in the ducts 37 will forwardly eject each puff arranged in the outer wall of the duct so that the lugs 48 will be forced against the hump portion of the switch bars 50 tending to force the upper portions thereof outwardly.

The next operation consists in pressing inwardly the button 85 of the adjusting switch 77 so that the outer contacting portion 82 engages the terminal 83. This switch is held in this position and the operating switch 78 of the corresponding combination is also pressed to circuit closing position, as shown in Figures 6 and 8. This arrangement of the button switches will close the circuit and energize the electromagnet 64 of one of the wind chests 60 so that the motor will be actuated to depress an arm 52 and swing the inner portion of the upper strip 51 to an elevated position. Thus, the upper portions of the contacts 51, resisting the pressure of the puffs in the inflated ducts, will be swung outwardly to the position shown in Figure 6. The button switches are then released, de-energizing the motor valve controlling magnet so that the strips 51 will be lowered to engage the upper extremities of the extending contact bars. The stop knobs 20, which have been withdrawn, are then retracted and the setting of the stop action combination is thus completed.

During the performance of a composition, the organist can operate simultaneously the pre-selected stop action combination by merely pressing the button 96 corresponding to the particular combination to be executed, the adjusting switch being retained in its normal outward position. This adjustment of the operating switch will energize the circuit from the battery through the terminal 81 through the conductor 91 actuating the wind motor 61 controlling the movement of the desired switch carrying strip 54 whereby the inner portion of this strip will be elevated so that the inwardly extending ends of the conducting wires 57 and 58 will engage the lower ends of the bars 50. The bars which have not been adjusted or set, and consequently whose lower ends will be disposed outwardly, will engage the shorter wires 57 closing the circuit between the battery and an electromagnet 29 controlling the operating of the knob retracting mechanism. This operation will retract the knob if extended or, will have no effect thereon if previously retracted. The longer contact wires 58 will engage the lower ends of the contact bars 50 which have been set, and whose lower ends are arranged inwardly, to close the circuit between the battery and the complementary electromagnet 29 so as to extend or force outwardly a stop action controlling knob 20. The resultant movement of the knob will close the contacts 24 to energize an electric circuit through the conductor 71 for operation of a stop action comprising one of the individual actions of the combination. When the control switch 78 is released the particular combination is rendered inoperative due to the disconnection of this circuit controlling the operative movement of the contact carrying strip 54.

It is to be understood that the form of our invention herein shown and described is to be taken as a preferred example of the same, and that various changes as to the shape, size, and arrangement of parts may be resorted to without departing from the spirit of the invention or the scope of the subjoined claims.

Having thus described our invention, we claim:—

1. In an organ including a plurality of stop actions, a plurality of stop controlling knobs, mechanism for actuating the knobs to on or off positions, electric circuits connecting the knob actuating mechanism with a source of electrical energy, knob controlling switches interposed in the said circuits, mechanism for setting the controlling switches of selected knobs, and means including a pneumatically controlled pivoted strip adapted to be retained in a setting block and to contact with one or the other of contacts for operation of the pre-selected stop actions electro-pneumatically.

2. In an organ including a plurality of stop controlling knobs mounted for adjustable movement, mechanism for automatically shifting the knobs to on or off positions, knob circuit controlling switches having adjustable contact members, mechanism operable to set the adjustable members, an electric circuit for controlling the operation of the switch setting mechanism, a switch in said control circuit operable to close the circuit for setting operation of the mechanism when the knob is drawn to on position, means for locking the adjusted switch members in set position, mechanism for actuating the switch locking members in on or off positions, an electric circuit controlling the operation of the locking member actuating mechanism, a contact carrying member operable to engage the adjustable contact of the knob circuit switches, mechanism for operating said contact carrying member, and an electric circuit controlling said mechanism whereby a combination of stop controlling knobs may be simultaneously operated through a single control switch.

3. In an organ including a plurality of stop controlling knobs mounted for adjustable movement, mechanism for automatically shifting the knobs to on or off positions, a contact button for closing a stop setting electric-circuit, electro-pneumatic means adapted to be actuated upon closure of the setting circuit, a pivoted spring-pressed contact strip adapted to be locked by the pneumatic means, flexible contacts carried by a contact member and adapted to contact with the pivoted strip, and contact buttons adapted to electro-pneumatically actuate the contact member so that electric circuits will be opened or closed when the flexible contacts engage the pivoted strip, whereby the stops will be directly actuated by their mechanism.

In witness whereof we have hereunto set our hands.

SAMUEL CASAVANT.
JOSEPH HEVEY.
ARTHUR LETIECQ.